United States Patent [19]

Daeges

[11] Patent Number: 5,073,866

[45] Date of Patent: Dec. 17, 1991

[54] TRAFFIC SIGNAL CONTROL SYSTEM

[76] Inventor: Michael J. Daeges, 16771 W. Ellendale Rd., Dallas, Oreg. 97338

[21] Appl. No.: 409,806

[22] Filed: Sep. 20, 1989

[51] Int. Cl.[5] ........................ B60Q 9/00; G06F 15/48

[52] U.S. Cl. ...................................... 364/436; 340/931

[58] Field of Search .................... 364/436, 551.01, 550, 364/483, 187, 900; 340/912, 931, 907, 641, 644; 307/11, 39

[56] References Cited

U.S. PATENT DOCUMENTS

| | | | |
|---|---|---|---|
| 2,363,185 | 1/1968 | Sanderson et al. | 340/912 |
| 3,323,106 | 5/1967 | Gazis et al. | 340/23 |
| 3,500,455 | 3/1970 | Ross et al. | 315/419 |
| 3,691,403 | 9/1972 | Newmeyer | 307/231 |
| 3,778,762 | 12/1973 | Jarko et al. | 340/46 |
| 3,918,026 | 11/1975 | Hoshika et al. | 340/912 |
| 4,135,145 | 1/1979 | Eberle | 340/931 |
| 4,216,462 | 8/1980 | McGrath et al. | 364/413.03 |
| 4,383,240 | 5/1983 | Staats, Jr. | 340/915 |
| 4,408,180 | 10/1983 | Metz | 340/909 |
| 4,463,339 | 7/1984 | Frick et al. | 364/436 |
| 4,521,871 | 6/1985 | Galdun et al. | 364/900 |
| 4,586,041 | 4/1986 | Carlson | 340/931 |
| 4,734,862 | 3/1988 | Marcus et al. | 364/436 |
| 4,811,010 | 3/1989 | Lucas | 340/931 |
| 4,835,534 | 5/1989 | Lucas | 340/931 |
| 4,903,011 | 2/1990 | Reinholm et al. | 340/461 |

*Primary Examiner*—Parshotam S. Lall
*Assistant Examiner*—Michael Zanelli
*Attorney, Agent, or Firm*—Klarquist, Sparkman, Campbell, Leigh & Whinston

[57] ABSTRACT

The control signals and associated output signals of traffic signal switching circuits are continuously monitored by a microprocessor. In the event of a microprocessor-detected failure of a switching circuit, a microprocessor controlled back-up switching circuit is available to maintain normal operation of the signal.

10 Claims, 1 Drawing Sheet

TRAFFIC SIGNAL CONTROL SYSTEM

TECHNICAL FIELD

This invention relates to traffic signal control systems, and particularly to switching systems for supplying current for illuminating traffic signal lights.

BACKGROUND INFORMATION

Traffic signals are usually controlled by a local traffic signal controller. The signal controller is programmed to provide control signals for the red, yellow and green lights of the signal. The control signals are applied to switching circuits. In response to the control signals, the switching circuits provide current, usually 120 volts AC, to the particular traffic signal light that is to be illuminated. Typically, a distinct switching circuit is associated with each traffic signal light.

The signal controller continuously monitors the output signals of each switching circuit to determine whether a switching circuit has failed. Such failure could produce a dangerous traffic condition. For example, a malfunctioning switching circuit could cause green lights to be displayed to intersecting traffic lanes.

Whenever a conventional signal controller detects a switching circuit failure, the controller departs from the programmed normal operation, and the traffic signal is controlled to flash red lights in all directions. This "flash mode" is maintained until the traffic signal is serviced.

Placing a traffic signal in a flash mode upon detection of a switching circuit malfunction is useful for the immediate protection of motorists traveling through that intersection. At many intersections, however, the flash mode will greatly interfere with traffic flow, making it necessary to service the signal as soon as possible after the malfunction is detected.

SUMMARY OF THE INVENTION

This invention is directed to a traffic signal control system that permits a traffic signal to continue normal operation despite failure of a switching circuit. The present invention provides a microprocessor controlled back-up switching circuit and related components for isolating the failed switching circuit and for substituting therefor the back-up switching circuit. Consequently, normal operation of the traffic signal is maintained, and the signal may be serviced at a time convenient to those responsible for traffic signal maintenance.

DESCRIPTION OF THE PREFERRED EMBODIMENT

Figure 1:
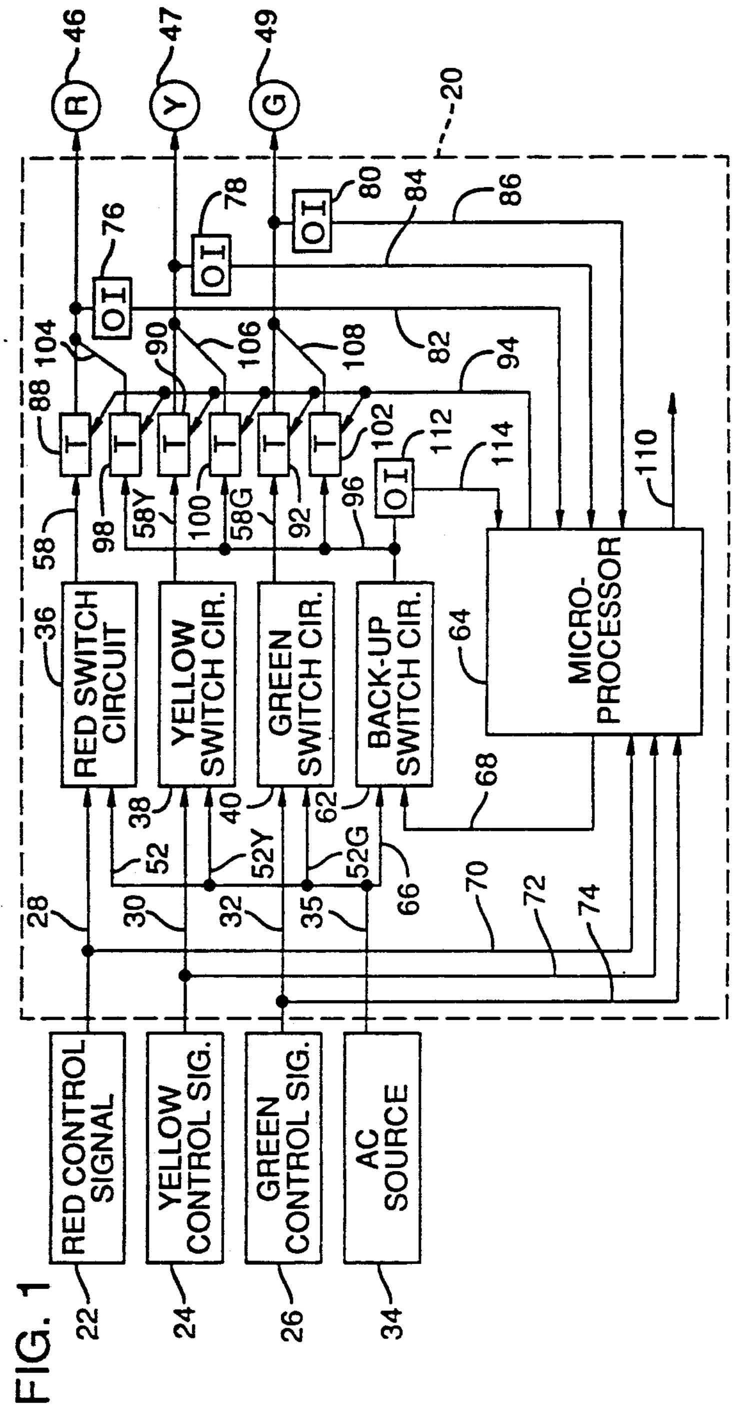
FIG. 1 is a block diagram of the traffic signal control system of the present invention.

FIG. 1 is a diagram of a preferred embodiment of the traffic signal control system 20 of the present invention. The traffic signal control system 20 receives from a conventional traffic signal controller (not shown) appropriately timed red control signals 22, yellow control signals 24 and green control signals 26 on lines 28, 30 and 32, respectively. A 120 volt AC source 34 is applied to the system 20 via line 35.

The red control signal 22 is applied over line 28 to a red switching circuit 36. Similarly, the yellow control signal 24 is applied over line 30 to a yellow switching circuit 38, and the green control signal 26 is applied over line 32 to a green switching circuit 40.

The red, yellow and green switching circuits 36, 38, 40 are substantially identical. Accordingly, referring to FIG. 2, one switching circuit (the red switching circuit 36) will be described here with the understanding that the yellow and green switching circuits 38, 40 are substantially identical. The reference numerals of certain components of the yellow and green circuits 38, 40 that are functionally identical to those in the red switching circuit 36 include a "Y" (yellow) or "G" (green) designation.

Figure 2:
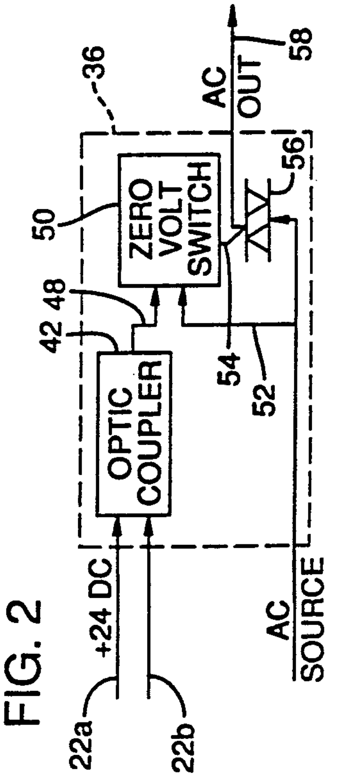
FIG. 2 is a diagram of a switching circuit used in conjunction with the traffic signal control system.

As shown in FIG. 2, the red switching circuit 36 includes an optical coupler 42 that is connected in series with a +24 volt DC source and an input line **22*b* that connects with the traffic signal controller (not shown). Whenever the red light 46 is to be illuminated, the signal controller places line 22*b* at ground potential so that the +24 volt DC source is applied via line 22*a* to the optical coupler 42. Accordingly, the +24 volt DC source and input line 22*b* provide the red control signal 22 that is shown as applied on the single line 28 in FIG. 1**.

The optical coupler 42, such as one manufactured by General Electric as Model No. 4N36, provides an output signal on line 48 to a zero-volt switching circuit 50. As described more fully below, the zero-volt switching circuit 50 responds to the optical coupler output signal on line 48 to turn ON a triac 56 so that the 120 volt AC source provided to the system 20 is delivered to the red light 46 via AC output line 58.

More particularly, the zero-volt switching circuit 50 includes a diode bridge and related switch components for providing on line 54, a gate signal for turning ON the triac 56 only after receiving the optical coupler output signal on line 48, and only during the time the AC source 34 is at, or very near, the zero volt crossover point. Consequently, very little surge current will reach the filament of the light 46.

As the traffic signal controller changes the control signal for illuminating another light (for example, the green light 49), the controller opens input line **22*b* so that no current flows from the +24 volt DC source to optical coupler 42 and, therefore, no optical coupler output signal is provided to the zero-volt switching circuit 50. Consequently, the zero-volt switching circuit 50 turns OFF triac 56, thereby extinguishing the red light 46**.

A suitable assemblage of the components described with respect to the switching circuit shown in FIG. 2 is found in a Model SSS-80-1 load switch manufactured by PDC of Dublin, Calif.

In the present invention, the red, yellow and green switching circuits 36, 38, 40 are supplemented with a back-up switching circuit 62, microprocessor 64, and related components for maintaining operation of the traffic signal in the event of failure of any of the other switching circuits 36, 38, 40. It is noteworthy here that a representative portion of the traffic signal control system 20 is depicted in FIG. 1, which portion is used for controlling three of the twelve lights of a conventional traffic signal. It is understood that in the preferred embodiment, a portion of the traffic signal control system as shown in FIG. 2 will be used for each set of three lights.

The structure of the back-up switching circuit 62 is substantially identical to the above-described red, yellow and green switching circuits 36, 38, 40. Accordingly, the back-up switching circuit 62 receives on line 66 the 120 volt AC source 34. The control signal for switching the AC source to the output line 96 of the back-up switching circuit 62 is generated by the microprocessor 64 (not by the traffic signal controller) and is applied to the circuit 62 over line 68.

The microprocessor 64 monitors the performance of the red, yellow and green switching circuits 36, 38, 40. In the event of failure of one of those circuits, the microprocessor 64 will interrupt the AC output of the failed switching circuit and redirect the control signal that is associated with the failed switching circuit 36 to the back-up switching circuit 62. The AC output of the back-up switching circuit 62 on line 96 will then be routed to the appropriate light.

More particularly, the microprocessor 64, such as a Signetics ADC751, receives as input from lines 70, 72 and 74 suitably interfaced signals that indicate when each of the red, yellow and green control signals 22, 24, 26 is being applied to the respective switching circuits 36, 38, 40. An optical coupler 76, 78, 80 is connected to each AC output line 58, 58Y and 58G, respectively. Each optical coupler 76, 78, 80 provides an output signal whenever the AC output of the corresponding switching circuit 36, 38, 40 is applied to the associated lights 46, 47, 49. The output signals of each optical coupler 76, 78, 80 are received as input by the microprocessor 64 over lines 82, 84 and 86, respectively.

The microprocessor 64 continually reads the above-described signals on lines 70, 72, 74, 82, 84, and 86 to detect instances where the AC output signals on lines 58, 58Y and 58G do not correspond to the control signals applied on lines 28, 30 and 32, respectively (for example, where, due to a malfunctioning triac, the output on line 58 remains at 120 volts AC after the control signal 28 to the red switching circuit 36 is removed by the signal controller). In such an instance, the microprocessor 64 will interrupt all current flow on the appropriate one of lines 58, 58Y or 58G. To this end, a triac 88, 90, 92 is connected to each AC output line 58, 58Y, 58G, respectively, between each switching circuit 36, 38, 40 and associated optical couplers 76, 78, 80. The microprocessor 64 applies on a bus 94 gate signals suitable for turning OFF whichever triac 88, 90, or 92 is associated with the failed switching circuit 36, 38, or 40.

At the time the microprocessor 64 turns OFF the appropriate triac 88, 90, or 92, it provides on line 68 a control signal to the back-up switching circuit 62. That control signal is timed to be substantially coincident with the control signal 22, 24 or 26 (as detected by the microprocessor 64 on line 70, 72 or 74) that is applied to the failed switching circuit 36, 38, or 40.

The AC output of the back-up switching circuit is directed over line 96 to the appropriate switching circuit output line 58, 58Y or 58G for illuminating the light 46, 47, 49 that is associated with the failed switching circuit. To this end, the output line 96 of the back-up switching circuit 62 is connected in parallel with three back-up triacs 98, 100, 102. The gates of the back-up triacs are controlled by signals provided on bus 94 by the microprocessor 64. The output of each triac 98, 100, 102 is connected via lines 104, 106 and 108, respectively, to the AC output lines 58, 58Y and 58G, respectively. The one back-up triac 98, 100 or 102 that is connected to the output line of the failed switching circuit 36, 38 or 40 will be turned ON by the microprocessor 64, the remaining back-up triacs will remain OFF.

The following further illustrates the operation of the traffic signal control system 20 of the present invention. Assuming that the red switching circuit 36 fails in a manner that its triac remains continuously ON, at the time the signal controller removes the red control signal on line 28 and applies the yellow control signal on line 30, the microprocessor 64 will detect over line 82 the presence of the 120 volt AC output on line 58, with no corresponding control signal on line 28. Consequently, the microprocessor 64 will turn OFF triac 88 with an appropriate gate signal applied on bus 94. The microprocessor 64 will also apply control signals on line 68 to the back-up switching circuit 62 each time the microprocessor receives on line 70 the red control signal placed on line 28 by the signal controller. Further, the microprocessor will apply an additional gate signal on bus 94 to turn ON triac 90 (triacs 100, 102 remaining OFF) so that the AC output of the back-up switching circuit 62 is directed across lines 96 and 104 to the output line 58 of the failed red switching circuit 36 for illuminating the red light 46.

Preferably, whenever a malfunction of a switching circuit is detected, the microprocessor 64 will provide a signal on line 110 that is indicative of the malfunctioning switching circuit so that the traffic signal may be readily serviced.

The AC output of the back-up switching circuit 62 applied on line 96 is monitored by the microprocessor 64 by a connected optical coupler 112, the output of which reaches the microprocessor over line 114. Consequently, the microprocessor 64 is able to detect any failure of the back-up switching circuit 62.

It will be appreciated by one of ordinary skill in the art that the components of the present invention are operable for testing the back-up switching circuit 62 and related components to ensure that those components will function properly in the event the primary switching circuits fail. For example, the microprocessor 64 can be programmed to periodically inactivate one switching circuit by turning OFF the appropriate triac 88, 90 or 92, and by activating the back-up switching circuit 62 as described earlier. Any failure of the back-up switching circuit 62 that is detected by the microprocessor during such diagnostic testing can be indicated at output 110.

While the present invention has been described in relation to a preferred embodiment, it is to be understood that various alterations, substitutions of equivalents and other changes can be made without departing from the spirit and scope of the invention as described in the appended claims.

I claim:

1. A traffic signal load switch system, comprising:

a first load switch connected to a current source and having an output line connected to a first light, the first load switch being responsive to a first control signal for applying current from the source to the output line thereby to illuminate the first light;

a back-up load switch connected to the current source and having a back-up line connected to the output line of the first load switch, the back-up load switch being responsive to a second control signal for applying current from the source to the back-up line;

back-up control means operable for interrupting the flow of current applied on the output line by the first load switch and for applying the second control signal to the back-up load switch so that the back-up load switch applies source current to the first light over the connected back-up line and output line, the back-up control means including a first control switch connected to the output line between the first load switch and the first light, the first control switch being operable for interrupting the flow of current applied on the output line by the first load switch.

2. The system of claim 1 wherein the back-up control means includes a second control switch connected to the back-up line between the back-up load switch and the first light, the second control switch being operable by the back-up control means for directing current in the back-up line to the first light.

3. The system of claim 2 wherein the first and second control switches are arranged so that the current applied to the back-up line by the back-up load switch reaches the first light irrespective of whether the flow of current applied on the output line by the first load switch is interrupted by the first control switch.

4. The system of claim 3 wherein the back-up control means is connected to detect the first control signal and to detect the presence of the current applied on the output line by the first load switch and to generate the second control signal whenever the back-up control means does not simultaneously detect the first control signal and the presence of the current applied on the output line by the first load switch.

5. A traffic signal load switch system, comprising:

a first load switch connected to a current source and having an output line connected to a first light, the first load switch being responsive to a first control signal for applying current from the source to the output line thereby to illuminate the first light;

a back-up load switch connected to the current source and having a back-up line connected to the output line of the first load switch, the back-up load switch being responsive to a second control signal for applying current from the source to the back-up line;

back-up control means operable for interrupting the flow of current applied on the output line by the first load switch and for applying the second control signal to the back-up load switch so that the back-up load switch applies source current to the first light over the connected back-up line and output line. the back-up control means being connected to detect the first control signal and to detect the presence of the current on the output line of the first load switch and to generate the second control signal whenever the back-up control means does not simultaneously detect the first control signal and the presence of the current applied on the output line by the first load switch.

6. A traffic signal load switch system comprising:

a first load switch connected to a current source and having an output line connected to a first light, the first load switch being responsive to a first control signal for applying current from the source to the output line thereby to illuminate the first light;

a second load switch connected to the current source and having an output line connected to a second light, the second load switch being responsive to a second control signal for applying current from the source to the output line of the second load switch thereby to illuminate the second light;

a back-up load switch connected to the current source and having a back-up line connected to the output line of the first and second load switch, the back-up load switch being responsive to a third control signal for applying current from the source to the back-up line; and back-up control means operable for interrupting the flow of current applied on the output line by the first load switch and for applying the third control signal to the back-up load switch so that the back-up load switch applies source current to the first light over the connected back-up line and first load switch output line; and the back-up control means being further operable for interrupting the flow of current applied on the second load switch output line and for applying a third control signal to the back-up load switch so that the back-up load switch applies current to the second light over the connected back-up line and output lien of the second load switch.

7. The system of claim 6 wherein the back-up control means includes a third control switch connected to the output line of the second load switch, the third control switch being operable by the back-up control means for interrupting the flow of current applied on the second load switch output line.

8. The system of claim 7 wherein the back-up control means includes a fourth control switch connected to the back-up line between the back-up load switch and the second light, the fourth control switch being operable by the back-up control means for directing current applied to the back-up line to the second light.

9. The system of claim 6 wherein the back-up control means detects the first and second control signals and generates the third control signal upon detecting one of the first and second control signals.

10. The system of claim 6 wherein the back-up control means interrupts the flow of current applied on the second load switch output line without interrupting the flow of current applied on the first load switch output line.

* * * * *

UNITED STATES PATENT AND TRADEMARK OFFICE
CERTIFICATE OF CORRECTION

PATENT NO. : 5,073,866

DATED : December 17, 1991

INVENTOR(S) : Michael J. Daeges

It is certified that error appears in the above-identified patent and that said Letters Patent is hereby corrected as shown below:

Column 6, line 32, "output lien" should be --output line--.

Signed and Sealed this

Twentieth Day of April, 1993

*Attest:*

MICHAEL K. KIRK

*Attesting Officer*

*Acting Commissioner of Patents and Trademarks*